United States Patent [19]

Evans et al.

[11] 4,200,785
[45] Apr. 29, 1980

[54] PULSE GENERATOR UNIT FOR FUEL PUMP REGISTER

[75] Inventors: Alfred C. Evans, Simsbury; Bruno S. Smilgys, Hartford, both of Conn.

[73] Assignee: Veeder Industries Inc., Hartford, Conn.

[21] Appl. No.: 912,308

[22] Filed: Jun. 5, 1978

[51] Int. Cl.² .......................... B67D 5/22; G06M 3/06
[52] U.S. Cl. ............................. 235/92 FL; 235/92 DE
[58] Field of Search ........... 235/92 C, 92 FL, 92 DE, 235/94 R, 94 A, 61 M; 364/465

[56] References Cited

U.S. PATENT DOCUMENTS

| | | | |
|---|---|---|---|
| 3,339,093 | 8/1967 | Beers | 235/92 C |
| 3,543,008 | 11/1970 | Kes et al. | 235/92 FL |
| 3,566,087 | 2/1971 | Dilger | 235/92 DE |
| 3,818,192 | 6/1974 | Anderson et al. | 235/92 FL |
| 4,100,400 | 7/1978 | Callahan et al. | 235/94 A |

*Primary Examiner*—Joseph M. Thesz
*Attorney, Agent, or Firm*—Prutzman, Kalb, Chilton & Alix

[57] ABSTRACT

A pulse generator bar unit adapted to be substituted for the totalizer bar unit of a conventional mechanical fuel pump register to modify the register for providing an electrical pulse train with an electrical pulse for each predetermined amount of fuel delivered.

7 Claims, 5 Drawing Figures

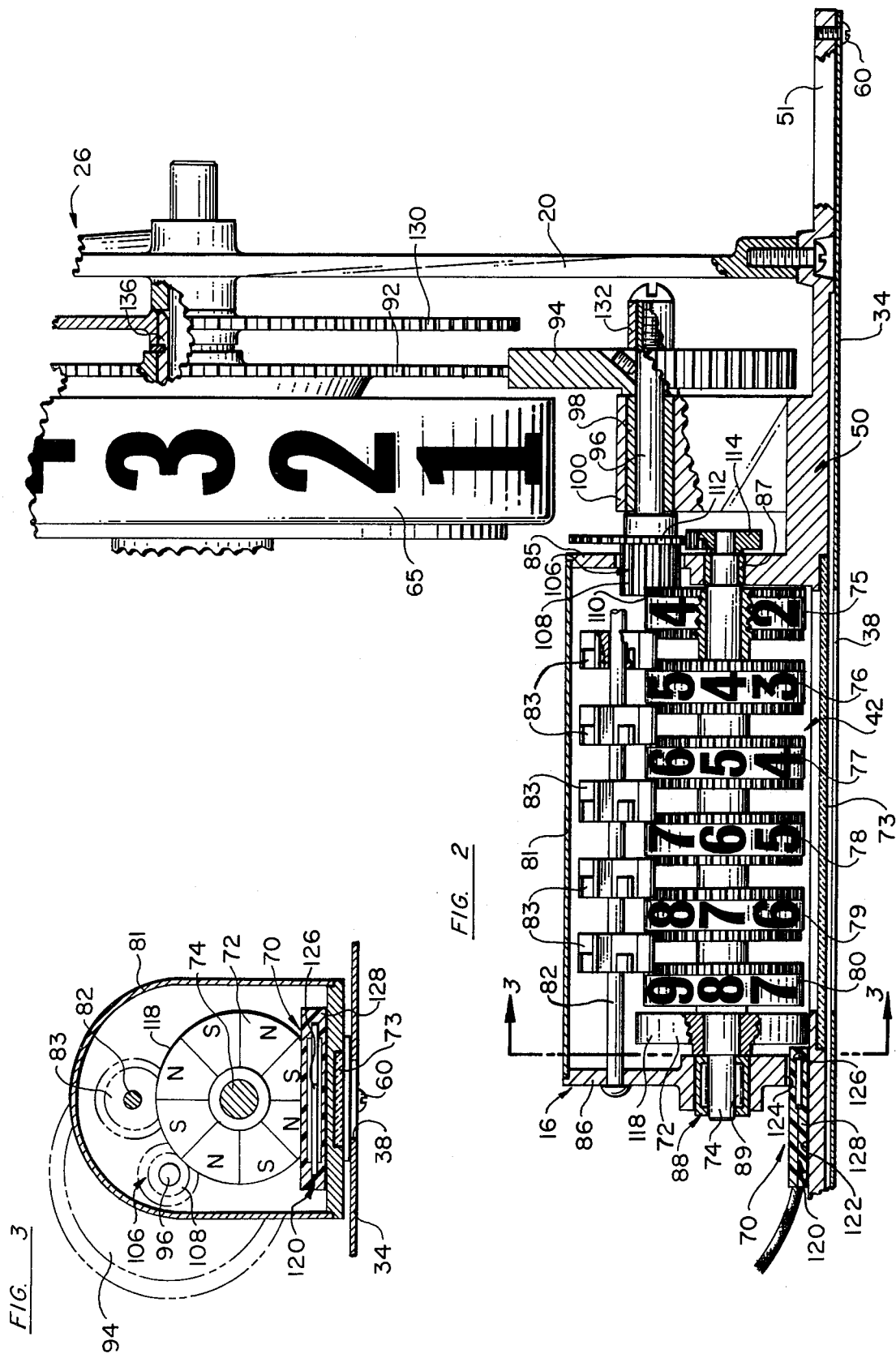

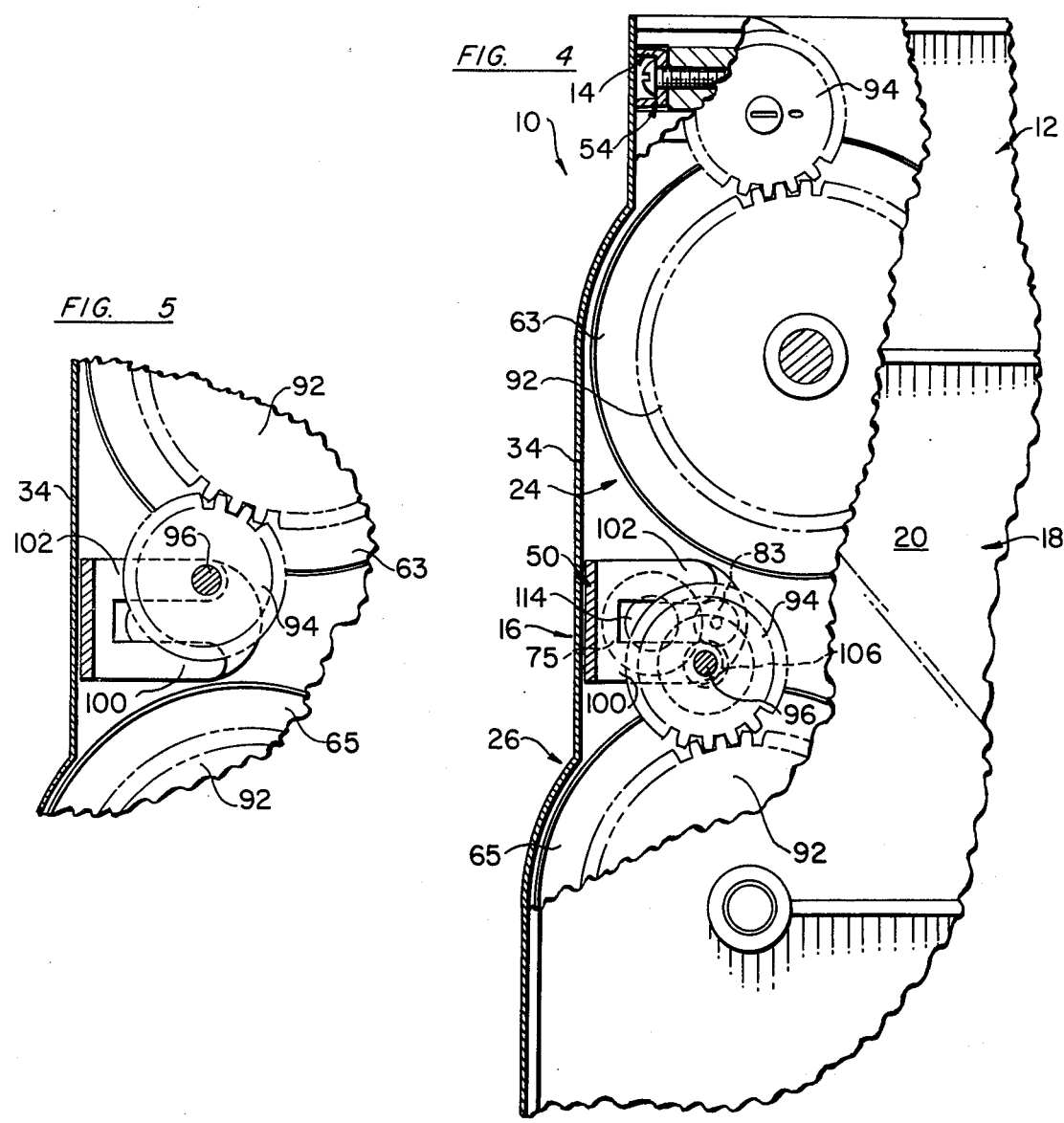

PULSE GENERATOR UNIT FOR FUEL PUMP REGISTER

BACKGROUND AND SUMMARY OF THE INVENTION

The present invention relates generally to mechanical fuel pump registers of the type having resettable cost and volume counters for registering the cost and volume amounts of each fuel delivery and more particularly to a new and improved pulse generator unit for fuel pump registers for generating an electrical pulse train with an electrical pulse for each predetermined amount of fuel delivered for use, for example, for remote registration of the amount of each fuel delivery. The pulse generator unit of the present invention is notably useful with fuel pump registers of the type (shown and described in U.S. Pat. No. 2,814,444 of Harvey N. Bliss, dated Nov. 25, 1967 and entitled "Register") having a supporting frame with upright side frames and two oppositely facing pairs of resettable cost and volume counters with respective banks of coaxial wheels mounted between the side frames for registering the cost and volume amounts of fuel delivered.

Conventionally, in mechanical fuel pump registers of the type described, mechanical cost and volume totalizers are provided on cross bars extending between the side frames of the register support frame to register the total volume and cost amounts of fuel delivered.

Also, pulse generator units have been previously provided which were mounted on the side of the register and suitably connected to generate a pulse for each predetermined amount of fuel delivered, for example, for operating remote post-pay equipment, for example of the type shown and described in U.S. Pat. No. 3,878,377 of Peter P. Brunone, dated Apr. 15, 1975 and entitled "Fluid Delivery Control and Registration System". The prior art pulse generator units in general were difficult and/or expensive to install on existing fuel pump registers in the field, and/or were too bulky and/or required modification of the register or register enclosure.

It is therefore a principal aim of the present invention to provide a new and improved pulse generator unit for conventional mechanical fuel pump registers which may be readily installed on existing registers in the field without otherwise modifying the register or the register enclosure.

It is another aim of the present invention to provide a new and improved pulse generator unit which may be readily installed on, and also as necessaary, removed from mechanical fuel pump registers of conventional design.

It is a further aim of the present invention to provide a new and improved pulse generator and totalizer unit for conventional mechanical fuel pump registers. Also, in accordance with the present invention, the pulse generator and totalizer unit may be used as either a volume or a cost unit.

It is another aim of the present invention to provide a new and improved pulse generator unit which may be used either as a reset version with the pulse generator reset while the register is reset between fuel deliveries or as a nonreset version.

It is another aim of the present invention to provide a new and improved pulse generator unit for converting a conventional mechanical fuel pump register for supplying an electrical pulse train with a pulse representing each predetermined amount of fuel delivered for remote registration of each fuel delivery.

It is a further aim of the present invention to provide a new and improved mechanical fuel pump register and pulse generator assembly which is substantially the same size as existing fuel pump registers and such that the improved register and pulse generator assembly can be readily substituted for an existing register without further modification of the fuel pump.

Other objects will be in part obvious and in part pointed out in more detail hereinafter.

A better understanding of the objects, advantages, features, properties and relations of the invention will be obtained from the following detailed description and accompanying drawings of illustrative embodiments indicating the ways in which the principles of the invention are employed.

BRIEF DESCRIPTION OF THE DRAWINGS

In the drawings:

FIG. 2 is an enlarged partial section view, partly broken away and partly in section, of the fuel pump register primarily showing one of the pulse generator units;

FIG. 3 is a section view, partly broken away and partly in section, taken substantially along line 3—3 of FIG. 2;

FIG. 4 is an enlarged partial side elevation section view, partly broken away and partly in section, of the fuel pump register; and FIG. 5 is an enlarged partial side elevation section view, partly broken away and partly in section, of a fuel pump register incorporating a modified embodiment of a pulse generator unit of the present invention.

DESCRIPTION OF THE PREFERRED EMBODIMENTS

Figure 1:
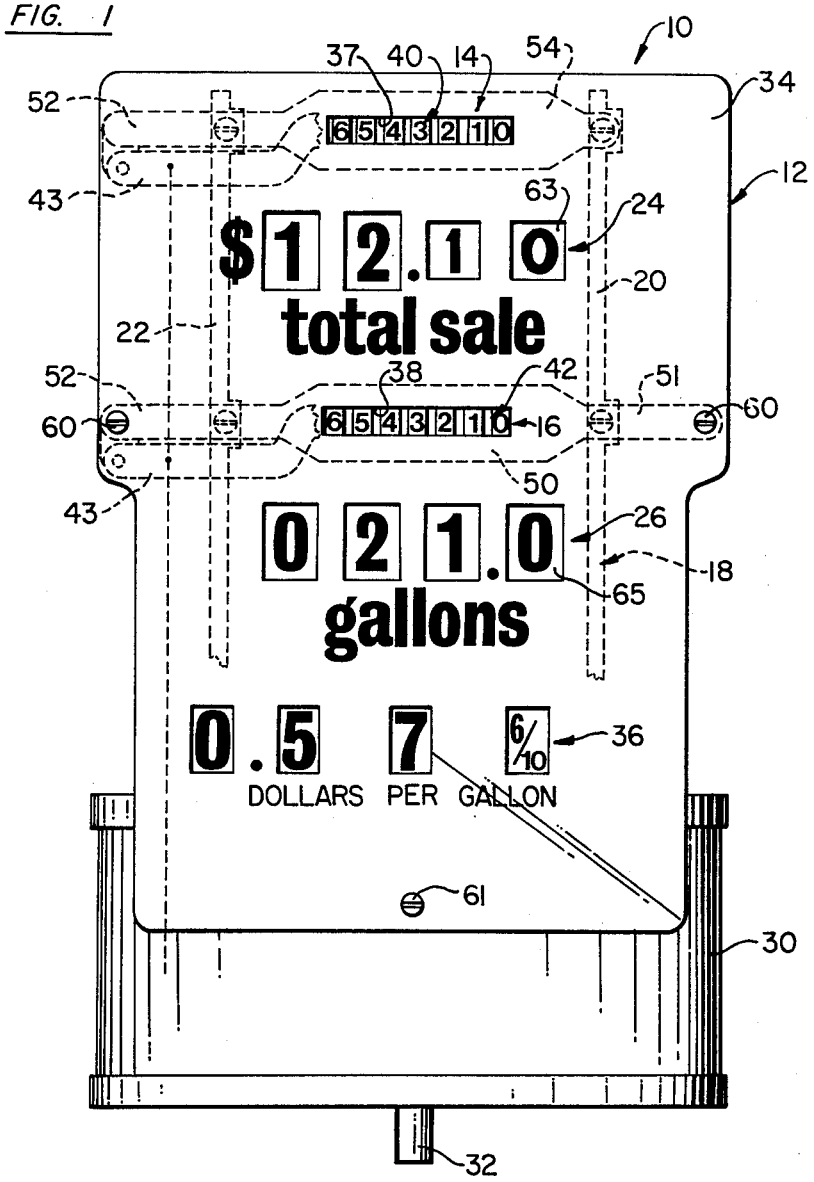
FIG. 1 is a front elevation view of a fuel pump computer having a mechanical fuel pump register incorporating embodiments of pulse generator units of the present invention.

Referring now to the drawings in detail wherein like reference numerals indicate like parts throughout the several figures, a fuel pump computer 10 having a mechanical register 12 incorporating embodiments 14, 16 of a pulse generator unit of the present invention is of conventional design excepting for the pulse generator units 14, 16. For example, the register 12 is generally of the type described in the aforementioned U.S. Pat. No. 2,814,444 and comprises a support frame 18 with a pair of spaced upstanding side frames 20, 22 and two pairs of oppositely facing resettable cost and volume counters 24, 26 (only one pair of counters being shown in the drawings) for registering the cost and volume amounts of fuel delivered. A suitable variator 30 (which, for example, is of the type described in U.S. Pat. No. 3,314,867 of Richard B. Hamlin, dated Dec. 3, 1968, and entitled "Variator") is mounted directly below the register 12 in a conventional manner for establishing and posting the unit volume price of fuel. The variator 30 has a vertical drive shaft 32 adapted to be driven by a fuel meter, and in a conventional manner the variator 30 is connected to the register 12 for driving the cost and volume counters 24, 26 for registering the volume amount of fuel delivered (e.g., in gallons) and the cost amount of fuel delivered in accordance with the volume amount delivered and the unit volume price established by the variator setting. A dial face 34 is provided on the front and back faces of the register 12 (only the front dial face 34 being shown) to provide a mask for the register mechanism and suitable windows for reading the cost and volume counters 24, 26 and the bank 36 of unit volume price wheels of the variator 30. Also, the front dial face 34 is formed with elongated horizontally extending windows 37, 38 above the upper cost counter 24 and between the cost and volume counters 24, 26 for reading cost and volume totalizers 40, 42 respectively forming a part of the pulse generator units 14, 16. Suitable shutters 43 (partly shown) may be provided in a conventional manner to normally cover the totalizers 40, 42 and which may be temporarily manually withdrawn for reading the cost and volume totalizers 40, 42.

The pulse generator units 14, 16 are substantially identical excepting that an elongated support frame 50 of the intermediate pulse generator unit 16 has lateral extensions 51, 52 at both lateral ends extending outwardly beyond the side frames 20, 22 respectively whereas the elongated support frame 54 of the upper pulse generator unit 14 has an outward lateral extension 52 at the left end only as viewed in FIG. 1. In that regard, the lower pulse generator unit 16 mounted between the cost and volume counters 24, 26 is used to support the dial face 34 and for that purpose has a pair of threaded openings at the outer ends of the lateral extensions 51, 52 for receiving dial face mounting fasteners 60. (The dial face is also secured at its lower end to the variator by an additional mounting fastener 61.) As the pulse generator units 14, 16 are otherwise the same, only the pulse generator unit 16 will be described hereinafter in detail. However, it should be understood that the upper pulse generator unit 14 is connected to the right hand cost counter wheel 63 to generate a pulse train with a pulse for each predetermined incremental cost amount of fuel delivered, whereas the intermediate pulse generator unit 16 is connected to the right hand volume counter wheel 65 to generate a pulse train with a pulse for each predetermined incremental volume amount of fuel delivered.

Referring particularly to FIGS. 2 and 3, the pulse generator unit 16 provides an assembly of a rotary pulse generator 70 with the rotary totalizer 42. More particularly, the design of the pulse generator unit 16 is based on the design of a conventional totalizer unit (not shown) which has been redesigned to incorporate the pulse generator 70 as an integral part of the assembly and whereby a rotary magnetized ceramic disc 72 of the pulse generator 70 is rotated with the totalizer 42. For that purpose, the magnetic disc 72 is mounted on a totalizer wheel shaft 74 at the left end of a bank of coaxial totalizer wheels 75–80 of ascending order which are rotatably mounted on the wheel shaft 74. The wheel shaft 74 and a transfer pinion shaft 82 for the totalizer wheel transfer pinions 83 are mounted on a pair of inwardly projecting integral stanchions 85, 86 of the elongated bar frame 50. A sheet metal housing 81 mounted on the bar frame 50 between the stanchions 85, 86 provides a rear enclosure for the totalizer 42 and the rotary permanent magnet disc 72. The totalizer 42 is readable from the front end of the register (along with the counters 24, 26) through a suitable protective window 73 mounted on the bar frame 50. A sleeve bearing 87 and a one-way roller brake 88 having locking rollers 89 are press fit within openings in the stanchions 85, 86 respectively for rotatably supporting the shaft 74. The one-way brake 88 permits rotation of the shaft 74 and magnetic disc 72 in the normal or additive direction, in the counterclockwise direction as viewed in FIG. 4, during a fuel delivery and prevents reverse rotation of the shaft 74 and magnetic disc 72 in the opposite direction which might otherwise occur, for example, due to mechanical rebound upon sudden termination of a fuel delivery.

The wheel drive gear 92 of the right hand volume wheel 65 (which is driven in a conventional manner, not shown, by the variator center shaft 32 for indexing the volume counter 26) is employed in the embodiment shown in FIG. 2 for driving an input gear 94 of the pulse generator unit 16. The input gear 94 is secured on a drive shaft 96 rotatably supported by a sleeve bearing 98 mounted within an integral inwardly projecting shaft support 100 of the bar frame 50. As seen in FIG. 4, the shaft support 100 is offset slightly from the axis of the wheel shaft 74 and positions the input gear 94 in proper engagement with the right hand volume wheel drive gear 92 of the volume counter 26. A similar shaft support 102 on the opposite side of the wheel shaft axis provides for mounting the drive shaft 96 as shown in FIG. 5 for positioning the input gear 94 in engagement with the wheel drive gear 92 of the right hand cost counter wheel 63 of the upper cost counter 24. Accordingly, the pulse generator unit 16 mounted between the cost and volume counters 24, 26 may be driven by the lower volume counter 26 as shown in FIG. 4 or be slightly modified to be driven by the upper cost counter 24 as shown in FIG. 5 (where, for example, an upper pulse generator unit 14 is not provided or where it is desired to mount a pulse generator unit 16 between the back pair of counters 24, 26 (not shown) at the opposite end of the register).

A compound gear 106 at the inner end of the drive shaft 96 has a first gear 108 thereof in engagement with a drive gear 110 of the lowest order or right hand totalizer wheel 75 and a second gear 112 thereof in mesh with a wheel shaft drive gear 114. Accordingly, the volume totalizer 42 is driven by the right hand volume wheel 65 via the gears 92, 94, shaft 96, and gears 108, 110; and the rotary pulse generator disc 72 is driven by the right hand volume wheel 65 via the gears 92, 94, shaft 96, gears 112, 114 and the wheel shaft 74. Accordingly, for example, a 1:1 drive ratio is established between the right hand volume wheel 65 and the totalizer 42 and a 1:6.25 drive ratio is independently established between the right hand volume wheel 65 and the pulse generator disc 72 so that the pulse generator disc 72 rotates six and one-fourth revolutions for each revolution of the right hand volume wheel 65.

The pulse generator disc 72 is magnetized to form an annular arrangement of, for example, eight equiangularly spaced alternating North and South permanent magnetic poles on its outer axial face 118. A reed switch magnetic pickup 120 is suitably mounted on an inner face 122 of the bar frame 50 and within a conforming slot 124 of the left stanchion 86. The pickup 120 comprises a small reed switch 126 mounted within a flat rectangular protective plastic support or case 128 and with the reed switch 126 positioned parallel and adjacent to the outer pole face 118 of the permanent magnet disc 72. The reed switch 126 is magnetically actuated by each of the eight poles of the disc 72 and preferably so that the open and closed switch phases are approximately equal. Accordingly, for each revolution of the permanent magnet disc 72, the reed switch 126 is magnetically closed eight times, each for preferably approximately $22\frac{1}{2}°$ of rotation of the disc 72. Each of the resulting approximately 22½° spaced edges of each switch closure pulse are preferably used in the circuit to which the reed switch 126 is connected so that, in effect, sixteen substantially equally spaced edge signals are generated for each revolution of the disc 72. Thus, with the exemplary 1:6.25 drive ratio described, the reed switch 126 is magnetically closed fifty times to generate one hundred approximately equally spaced edge signals for each revolution of the right hand volume counter wheel 65. Therefore, ten edge signals are generated for each one-tenth gallon amount of fuel delivered and such that a remote volume register (not shown) can be suitably connected for being operated by the pulse generator 70 to accurately register the volume displayed by the volume counter 26.

In similar fashion, the cost pulse generator unit 14 provides for generating one hundred approximately equally spaced edge signals for each revolution of the right hand cost counter wheel 63. Accordingly, where the lowest order cost wheel 63 is a dual-transfer, twenty-count or twenty cent wheel, five edge signals are generated for each one cent cost amount of fuel delivered. A remote cost register (not shown) can therefore be suitably operated by the cost pulse generator unit 14 to register the cost displayed by the cost counter 24.

The pulse generator units 14, 16 can be readily installed on existing registers in the field by merely substituting the pulse generator bar units 14, 16 for the usual totalizer bar units (not shown). Alternatively, the pulse generator bar unit 14 or 16 (or a suitable modification thereof) can be readily installed at the opposite or back face of the register (above the back cost counter or intermediate the back pair of cost and volume counters) in place of the corresponding frame connector bar (not shown) provided between the side frames 20, 22. Also, where a pulse generator unit is installed between the back pair of cost and volume counters, the pulse generator unit could be installed with the input gear 94 in engagement with the drive gear 92 of either the volume counter or the cost counter, and/or a modified pulse generator unit not incorporating a totalizer could be employed.

Referring to FIG. 2, it is further contemplated that the pulse generator unit 16 or 14 may be modified to be driven by an auxiliary resettable wheel gear 130 instead of the non-resettable wheel drive gear 92. For that purpose, a spacer sleeve 132 is shown provided on the drive shaft 96 to be interchanged with the input gear 94 to position the input gear 94 in mesh with the auxiliary resettable wheel gear 130. The auxiliary resettable wheel gear 130 is mounted on and suitably secured to the hub 136 of the wheel 65 so that the gear 130 is rotated to reset the rotary magnetic disc 72 as the wheel is reset. Accordingly, if the wheel is adapted to be reset in a reverse angular direction (i.e., in the clockwise direction as viewed in FIGS. 4 and 5) to the normal direction of operation as in the aforementioned U.S. Pat. No. 2,814,444, a suitable roller bearing or sleeve bearing (not shown) is employed in place of the one-way brake 88 to permit the wheel shaft 74 to be rotated in the reverse direction. With the magnetic disc 72 reset at the end of each delivery, the first pulse or reed switch closure preferably occurs after a predetermined angle of rotation of the disc 72 and wheel 65 and whereby the pulse generator drive ratio and angular pole spacing may be modified to provide, for example, one pulse for each one-tenth gallon amount of fuel delivered and an edge signal for each one cent cost amount of fuel delivered.

As will be apparent to persons skilled in the art, various modifications, adaptations and variations of the foregoing specific disclosure can be made without departing from the teachings of the present invention.

I claim:

1. In a resettable fuel pump delivery register for registering the cost and volume of each fuel delivery and having a main frame with a pair of spaced generally parallel upright side frame members, at least one pair of upper and lower resettable cost and volume counters with respective banks of coaxial resettable cost and volume counter wheels of increasing order with respective coaxial wheel gears rotatable therewith, the pair of cost and volume counters being mounted on the main frame with their counter wheel banks mounted between the side frame members and with their axes generally parallel and perpendicular to the side frame members for being read from one end of the register, the improvement wherein the resettable fuel pump delivery register further comprises an elongated pulse generator bar unit having an elongated bar frame mounted on the side frame members and extending therebetween generally parallel to the axes of the cost and volume counters, first and second longitudinally extending parallel and offset drive and wheel shafts rotatably mounted on the bar frame generally parallel to the axes of the cost and volume counters, an input gear mounted at one end of the drive shaft in engagement with a wheel gear of one of the counter wheels for rotating the drive shaft by said one counter wheel, gear means mounted at the other end of the drive shaft having totalizer and pulse generator drive gears driven by the drive shaft, a rotary totalizer mounted on the bar frame having a plurality of totalizer wheel indicators of ascending order rotatably mounted on the wheel shaft for being read from said one end of the register and gear means in engagement with the totalizer drive gear for rotating the totalizer for indicating the total amount of fuel delivered, a wheel shaft drive gear mouned at one end of the wheel shaft for engagement with the pulse generator drive gear for rotating the wheel shaft therewith, and a rotary pulse generator having a rotary permanent magnet mounted at the other end of the wheel shaft for being rotated thereby and a magnetic pickup operable by the rotary permanent magnet for generating a pulse train with a pulse for each predetermined increment of rotation of the rotary permanent magnet and therefore of said one counter wheel.

2. A resettable fuel pump delivery register according to claim 1 wherein the elongated bar frame has a pair of longitudinally spaced stanchions rotatably supporting the wheel shaft, wherein the totalizer wheel indicators and rotary permanent magnet are mounted on the wheel shaft between the stanchions and with the rotary permanent magnet adjacent one of the stanchions, and wherein said one stanchion has a slot receiving the magnetic pickup for mounting the pickup adjacent the rotary magnet.

3. A resettable fuel pump delivery register according to claim 1 or 2 further comprising one-way brake means permitting rotation of the rotary permanent magnet in only one direction thereof corresponding to the direction of rotation of said one counter wheel during the delivery of fuel.

4. An elongated pulse generator bar unit for a resettable fuel pump delivery register of the type having a main frame with a pair of spaced generally parallel upright side frame members, at least one pair of upper and lower resettable cost and volume counters with respective banks of coaxial resettable cost and volume counter wheels of increasing order with respective coaxial wheel gears rotatable therewith, the pair of cost and volume counters being mounted on the main frame with their counter wheel banks mounted between the side frame members and with their axes generally parallel and perpendicular to the side frame members for being read from one end of the register, comprising an elongated narrow bar frame mounted on the side frame members laterally outwardly of the cost and volume counters and extending therebetween generally parallel to the axes of the cost and volume counters, a rotary pulse generator having a rotary permanent magnet rotatably mounted on the bar frame about an axis generally parallel to and laterally outwardly of the axes of the cost and volume counters and a magnetic pickup mounted on the bar frame adjacent to the rotary permanent magnet and operable thereby for generating a pulse train with a pulse for each predetermined increment of rotation of the rotary permanent magnet, and an input gear operatively connected to the rotary permanent magnet and rotatably mounted on the bar frame about an axis parallel to and laterally inwardly of the axis of the permanent magnet and in engagement with one of the wheel gears for connecting the rotary permanent magnet for rotation by said one wheel gear.

5. An elongated pulse generator bar unit according to claim 4 wherein the bar unit further comprises a rotary totalizer mounted on the bar frame coaxial with the rotary permanent magnet for being read from said one end of a said register and operatively connected to the input gear for being rotated thereby.

6. An elongated pulse generator bar unit according to claim 4 wherein the bar unit further comprises one-way brake means permitting rotation of the rotary permanent magnet in only one direction thereof corresponding to the direction of rotation of said one counter wheel during the delivery of fuel.

7. In a resettable fuel pump delivery register for registering the cost and volume of each fuel delivery and having a main frame with a pair of spaced generally parallel upright side frame members at least one pair of upper and lower resettable cost and volume counters with respective banks of coaxial resettable cost and volume counter wheels of increasing order with respective coaxial wheel gears rotatable therewith, the pair of cost and volume counters being mounted on the main frame with their counter wheel banks mounted between the side frame members and with their axes generally parallel and perpendicular to the side frame members for being read from one end of the register, the improvement wherein the resettable fuel pump delivery register further comprises an elongated pulse generator bar unit having an elongated narrow bar frame mounted on the side frame members laterally outwardly of the cost and volume counters and extending therebetween generally parallel to the axes of the cost and volume counters, a rotary pulse generator having a rotary permanent magnet and a rotary totalizer having a plurality of coaxial rotary indicators of ascending order, the rotary magnet and coaxial indicators being rotatably mounted on the elongated bar frame about a common axis generally parallel to and laterally outwardly of the axes of the cost and volume counters and so that the coaxial indicators can be read from said one end of the register, and an input gear operatively connected to the rotary permanent magnet and rotary totalizer and rotatably mounted on the bar frame for engagement with one of the wheel gears for connecting the rotary magnet and rotary totalizer for rotation by said one wheel gear.

* * * * *